March 31, 1964

L. K. V. SUDROW 3,127,093

DUCTED SUSTAINING ROTOR FOR AIRCRAFT

Filed Sept. 29, 1961

*INVENTOR.*
LYLE K. V. SUDROW

BY Knox & Knox

March 31, 1964   L. K. V. SUDROW   3,127,093
DUCTED SUSTAINING ROTOR FOR AIRCRAFT
Filed Sept. 29, 1961   2 Sheets-Sheet 2

*INVENTOR.*
LYLE K. V. SUDROW
BY Knox & Knox

United States Patent Office 3,127,093
Patented Mar. 31, 1964

3,127,093
DUCTED SUSTAINING ROTOR FOR AIRCRAFT
Lyle K. V. Sudrow, Los Angeles, Calif., assignor to Helipod, Inc., Oceanside, Calif.
Filed Sept. 29, 1961, Ser. No. 141,765
6 Claims. (Cl. 230—123)

The present invention relates generally to aircraft and more particularly to a ducted sustaining rotor for aircraft.

The primary object of this invention is to provide a ducted rotor of comparatively small diameter which is capable of sustaining a considerable load, while minimizing the objectionable downward airflow normally associated with rotor craft such as helicopters.

Another object of this invention is to provide a ducted rotor having wide blades which produce lift in the manner of wings, rather than actual thrust as produced by a propeller.

Another object of this invention is to provide a ducted rotor using counter-rotating rotors designed to have a minimum of interference between their airflows.

Still another object of this invention is to provide a ducted rotor in which clearances between the blade tips and duct wall are not critical and may even be quite large, the rotor having means to minimize tip losses.

A further object of this invention is to provide a rotor in which the blades have flexible skin portions permitting automatic changes of camber to suit load conditions.

Finally, it is an object to provide a ducted rotor of the aforementioned character which is simple and convenient to manufacture, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

General Structure

Figure 1:
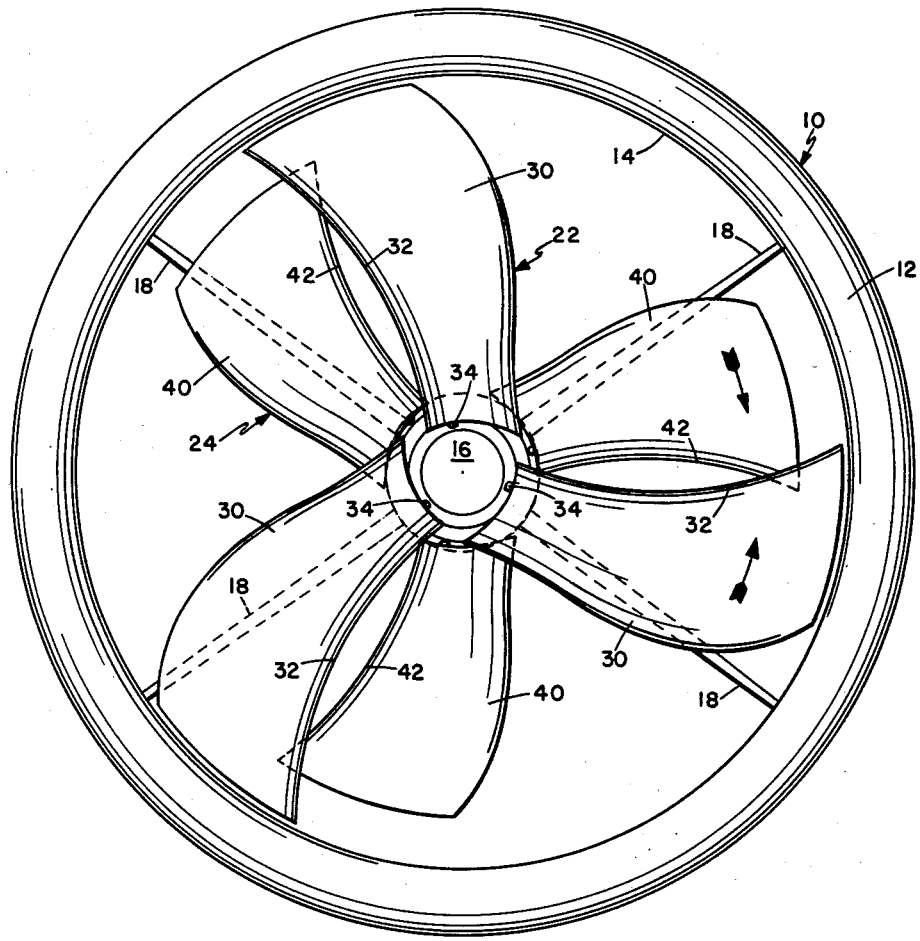
FIGURE 1 is a top plan view of the complete ducted rotor.
Figure 2:
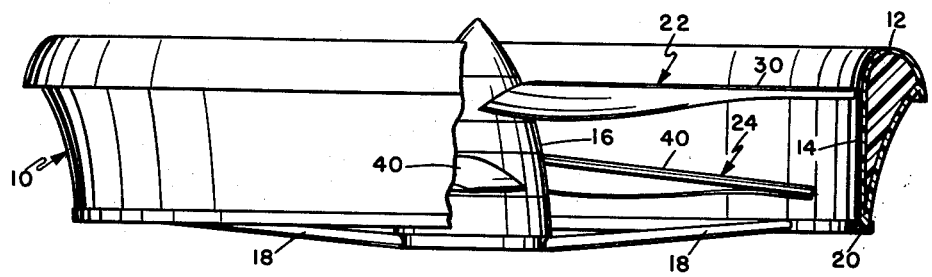
FIGURE 2 is a side elevation view thereof, partially cut away.
Figure 3:
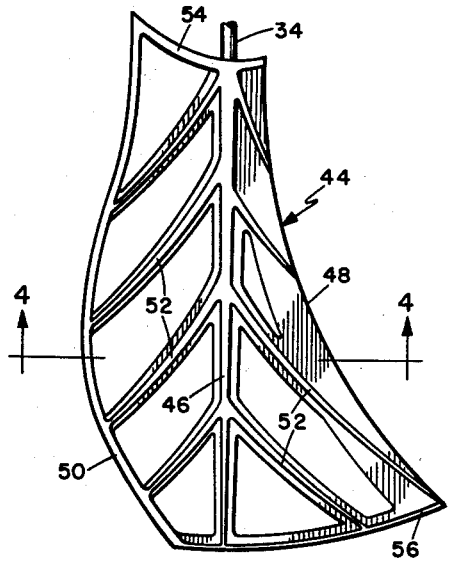
FIGURE 3 is an enlarged top plan view of the internal structure of a single rotor blade.

Referring now to FIGURES 1 and 2, the structure includes a circular duct 10 having a curved upper lip 12 and a substantially vertical inner wall 14, the duct acting primarily as a shielding element as described in detail in the portion of the specification entitled "Operation." The exact shape of the duct is not critical and is dependent on the particular aircraft and use. Centrally mounted in the duct 10 is a hub 16 supported by generally radially extending arms 18 fixed to the reinforced lower edge 20 of the duct. The hub 16 carries on upper rotor 22 and a lower rotor 24 which are counter-rotational axially within the duct. The gearing for driving the rotors is conventional and well known and can be fully enclosed in hub 16. Various types of power units can be used to drive the rotors and may be positioned to suit, either in the hub or in an airframe structure attached thereto. A single rotor can be used, but the counter-rotating arrangement is preferable to eliminate torque. No specific aircraft structure has been indicated, since the rotor unit may be mounted above an airframe, in the manner of a helicopter rotor, or built as an integral part of an aircraft, the design being subject to considerable variation.

Rotor Construction

Each rotor is illustrated as having three blades, although other arrangements may be used. Each blade 30 of upper rotor 22 is of low aspect ratio and has a concave leading edge 32, preferably arcuate, and gradually increases in width from the inboard or root end to the tip, the blade being supported on a shaft 34 extending substantially radially from hub 16. The blades are swept forward so that a large portion of blade area is disposed forwardly of the axes of their respective shafts 34. Blades 30 have a considerable clearance between their tips and the duct wall 14, compared to ducted fans in which clearances are on the order of small fractions of an inch, the reason for such clearance being hereinafter described.

The blades 40 of lower rotor 24 are similar in design to blades 30 and have concave leading edges 42, their mounting and alignment being as described above with respect to FIGURE 1, but for the opposite direction of rotation. Blades 40 are, however, considerably shorter in span than blades 30, with large tip clearance, and are disposed at a negative dihedral angle from hub 16, while blades 30 are substantially horizontal as indicated in FIGURE 2.

Figure 6:
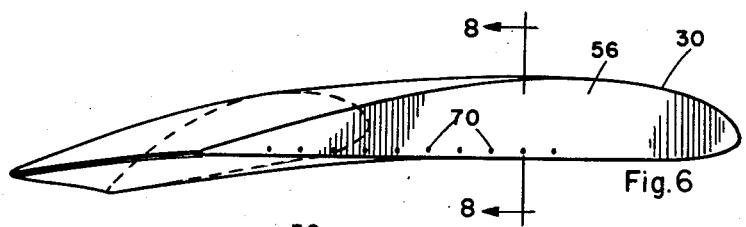
FIGURE 6 is a tip end elevation view of the blade.
Figure 7:
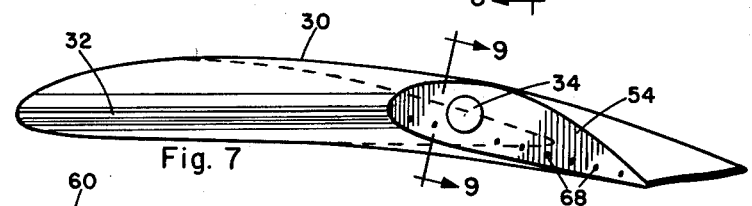
FIGURE 7 is a root end elevation view of the blade.
Figures 8, 9:
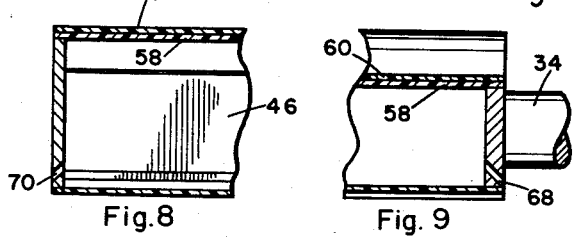
FIGURE 8 is an enlarged, fragmentary sectional view taken on the line 8—8 of FIGURE 6.
FIGURE 9 is an enlarged, fragmentary sectional view taken on the line 9—9 of FIGURE 7.

The rotor blades have progressively decreasing pitch angle from root to tip, as illustrated in FIGURES 6 and 7. At the root end, the pitch angle is relatively high, on the order of 9 or 10 degrees positive, while the pitch angle at the tip is reduced to about one degree positive. A large portion of the outer blade is at a low pitch angle, considerably less than the angle of conventional fans or propellers. The maximum thickness of the blade is substantially constant from root to tip at a specific percentage of chord, the precise airfoil section being subject to some variation. Thus, the root end airfoil has a low thickness to chord ratio as in a propeller, while the tip airfoil has a high thickness to chord ratio comparable to a conventional wing.

While the rotor blades may be constructed in various ways, one particularly suitable configuration is illustrated in FIGURES 3–5 and 8–9, a blade 30 being used as an example. The internal structure of the blade, indicated generally at 44, comprises a longitudinal spar 46, a leading edge outline member 48 and a trailing edge outline member 50, interconnected by multiple ribs 52. The root end has a complete root rib 54 shaped to conform closely to the hub 16, the tip having a complete tip rib 56 arcuately curved to conform to the inner wall of duct 10, as in FIGURE 3. The ribs 52, as illustrated, are arranged in a "tree" pattern which is very efficient as regards stress characteristics, but more conventional chordal ribs could be used. The entire inner structure is cast or otherwise formed with the spar and ribs dimensioned to provide proper overall aerodynamic shape. Lightening holes may be provided as necessary according to standard aircraft practice. The blade mounting shaft 34 may be integral with or suitably fixed to the spar 46.

Figure 4:
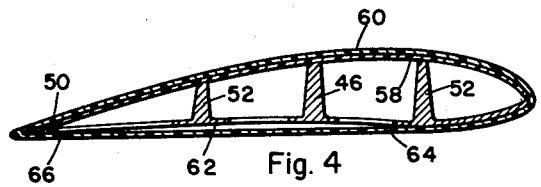
FIGURE 4 is an enlarged sectional view taken on the line 4—4 of FIGURE 3.

As indicated in FIGURE 4, the upper surface of the blade is covered by an inner skin 58 of substantially rigid material, such as plastic, formed to the required airfoil contours. The entire blade structure is enclosed in an outer skin 60, of which the lower portion at least is resilient. This outer skin 60 may be made from glass fiber reinforced plastic in the form of a sleeve or boot, the basic blade structure being inserted and the skin cured to finished form in a mold, or the like. Alternatively, formed metal outer skins may be used. The under side of the internal structure 44 has an undercambered surface 62, shown clearly in FIGURE 4, but the outer skin 60 is substantially flat and thus spaced from the undercambered surface.

Figure 5:
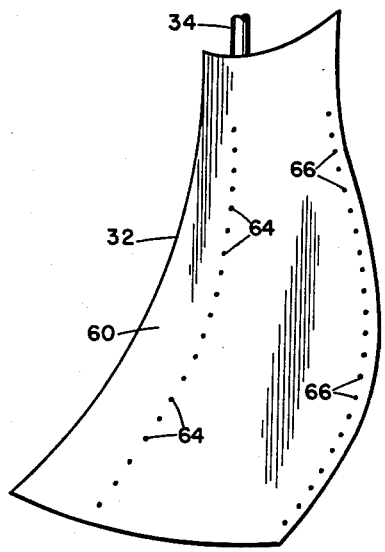
FIGURE 5 is a bottom plan view of a single rotor blade.

The outer skin 60 has a row of small spaced perforations 64 extending longitudinally substantially along the line of camber transition from concave to convex surface, as in FIGURES 4 and 5. A second line of perforations 66 is made in the bottom skin immediatley forwardly of trailing edge member 50. The root rib 54 is provided with a plurality of spaced inlets 68 extending inwardly and upwardly from adjacent the lower edge, as in FIGURES 7 and 9. Also, the tip rib 56 has a plurality of spaced outlets 70 rearwardly of the spar and inclined downwardly and outwardly adjacent the lower edge, as in FIGURES 6 and 8. The inlets, outlets and perforations are all small and serve to ventilate the blades for reasons given hereinafter.

Operation

When the rotors 22 and 24 are rotated, the blades develop lift according to the speed of rotation. The large area blades function in the manner of wings and provide considerable lift, without the large, downwardly forced airflow common to helicopters and ducted fans utilizing propeller type thrust. In other words, a conventional propeller produces thrust by a screw action through the air, displacing and moving a considerable column of air at high velocity, while the rotor herein described is effectively a rotating wing providing lift rather than thrust with its airfoil at a relatively low angle of attack.

The duct 10, therefore, is not so much a funnel or tube to conduct a large mass, high speed air column, as a shield or open annular chamber in which air is contained for the rotating wings to lift upon. In the helicopter, with its exposed rotor, air can flow across the plane of the rotor and does so in lateral flight. The blade advancing in the direction of flight is thus subjected to a higher effective airspeed and is more effective than the receding blade, requiring the use of complex cyclic pitch control of the blades to avoid offset thrust. The rotor illustrated is shielded by the duct against transverse flow, the air being restricted to motion substantially axially through the duct. No cyclic pitch control is necessary and, in fact, the rotor blades can be fixed in pitch if rotational speed control is used to adjust lift. It is thus evident that the rotor system is extremely simple mechanically and functionally.

In all counter-rotating propeller or rotor systems, some airflow disturbance between rotors is inevitable, unless spacing is increased to an impractical degree. The negative dihedral of the lower rotor blades increases separation to some extent and the interference is not too pronounced due to the relatively low airflow speed through the duct. Further, the concave leading edges of the blades approach each other and overlap with a slicing or scissor type action, as indicated in FIGURE 1, rather than meeting along their entire length simultaneously and producing the "slapping" action inherent in some counter-rotating systems.

Ducted propellers and fans normally require minimum clearance between blade tips and duct walls to reduce tip losses from vortexing and turbulence. The close tolerances involved increase cost and construction difficulties. In the present rotor system, tip vortex formation is not so pronounced due to the lower airflow speeds involved and is further minimized by utilizing centrifugal airflow which is inherent in a spinning rotor. Air is drawn in through the root end inlets 68 and flows through the blades under centrifugal action, the open inner structure and lightening holes providing sufficient freedom of flow. The centrifugally driven air is exhausted outwardly and downwardly from the tip outlets 70, into the zone where vortices normally form, so minimizing turbulence and providing an effective boundary layer along the duct inner wall 14. Considerable tip clearances can thus be tolerated, with consequent reduction in cost. The perforations 66 allow leakage airflow at the trailing edge where turbulance may occur.

The resilient lower portion of the outer skin 60 flexes under varying load conditions, caused by maneuvers, gusts, or the like, and changes the airfoil camber. As load increases, the skin is forced upwardly, giving the blade an undercamber which results in increased lift to support the load, the various perforations allowing the blades to "breathe" and permit the camber changes. The perforations 64 provide added flow at the lower surface in the zone of camber change to minimize disturbance or flow breakaway due to surface fluctuations. Further vents or perforations may be provided at other locations for boundary layer control, the centrifugal action providing airflow without the need for pumps or the like.

Advantages

The rotor system eliminates complex and costly pitch control and pitch cycling mechanisms and their attendant actuating means. Structure is simplified and weight kept to a minimum. Downward air velocity is minimized, with the result that there is less blowing of dust during take off and landing and less discomfort to persons in the vicinity. The small rotor size reduces the space required for operation, yet produces lift comparable to that of a large wing. Centrifugal action of the rotors provides gyroscopic stability and inherent stability is increased due to elimination of the multiple degrees of rotor blade freedom common to helicopters. Vibration is reduced and the centrifugal effects of rotation is used to provide airflow for avoiding turbulence and lift losses. Since the rotors function in the manner of wings rather than propellers, it may be feasible in certain applications to use the system without a duct.

It is understood that minor variation from the form of the invention disclosed herein may be made without departure from the spirit and scope of the invention, and that the specification and drawing are to be considered as merely illustrative rather than limiting.

I claim:

1. An aircraft sustaining rotor system comprising:
a circular shielding duct;
a hub axially mounted in said duct;
a pair of driven, counter-rotating rotors operatively mounted on said hub in axially spaced relation, each rotor having a plurality of blades and being substantially shielded from transverse airflow by said duct;
each of said blades being of low aspect ratio and increasing in chord from root to tip;
the angle of incidence of each blade decreasing from root to tip, with the major outer portion of each blade having an angle of incidence of less than five degrees positive.

2. An aircraft sustaining rotor system comprising:
a circular shielding duct;
a hub axially mounted in said duct;
a pair of driven, counter-rotating rotors operatively mounted on said hub in axially spaced relation, each rotor having a plurality of blades and being substantially shielded from transverse airflow by said duct;
each of said blades being of low aspect ratio and increasing in chord from root to tip;
the angle of incidence of each blade decreasing from root to tip, with the major outer portion of each blade having an angle of incidence of less than five degrees positive;

and each of said blades having a concave leading edge.

3. An aircraft sustaining rotor system comprising:

a circular duct;

a hub axially mounted in said duct;

a pair of driven, counter-rotating rotors operatively mounted on said hub, each rotor having a plurality of blades;

each of said blades having air inlets at the root end thereof and downwardly and outwardly opening outlets at the tip thereof;

each blade having hollow portions inside for centrifugal flow of air through the blade, whereby the air emerging from said outlets minimizes vortex formation at the tip.

4. An aircraft sustaining rotor system according to claim 3, wherein each of said blades has spaced perforations in the lower surface thereof adjacent the trailing edge to exhaust air in the region of the trailing edge.

5. An aircraft sustaining rotor system comprising:

a circular duct;

a hub axially mounted in said duct;

a pair of driven, counter-rotating rotors operatively mounted on said hub, each rotor having a plurality of blades of low aspect ratio;

each of said blades having a substantially rigid inner structure conforming to the airfoil section of the blade, the trailing portion of said inner structure having an undercambered lower surface;

each blade having a substantially flat lower skin of resilient material, deformable under load to conform to said undercambered surface; and said lower skin having air conducting perforations therein.

6. An aircraft sustaining rotor system according to claim 5 and in which said perforations in said lower skin are immediately forwardly of said undercambered surface;

and air inlets in the root end of each of said blades.

References Cited in the file of this patent

UNITED STATES PATENTS

| 1,683,949 | Bergdoll | Sept. 11, 1928 |
| 2,058,361 | Sherwood | Oct. 20, 1936 |
| 2,212,041 | Pfautsch | Aug. 20, 1940 |
| 2,269,287 | Roberts | Jan. 6, 1942 |
| 2,292,089 | Reid | Aug. 4, 1942 |
| 2,350,962 | Hays | June 6, 1944 |
| 2,774,552 | Glad | Dec. 18, 1956 |
| 2,863,621 | Davis | Dec. 9, 1958 |
| 2,918,231 | Lippisch | Dec. 22, 1959 |
| 2,953,321 | Robertson | Sept. 20, 1960 |

FOREIGN PATENTS

| 865,568 | Great Britain | Apr. 19, 1961 |

OTHER REFERENCES

NACA Report #326, p. 503 (FIG. 2).